United States Patent

Ogawa et al.

Patent Number: 5,861,605
Date of Patent: Jan. 19, 1999

[54] HIGH NITROGEN FLUX CORED WELDING WIRE FOR CR-NI TYPE STAINLESS STEEL

[75] Inventors: Tsuneshi Ogawa; Toshiharu Maruyama; Shigeki Nishiyama; Shintaro Ozaki, all of Fujisawa, Japan

[73] Assignee: Kabushiki Kaisha Kobe Seiko Sho, Kobe, Japan

[21] Appl. No.: 736,722

[22] Filed: Oct. 25, 1996

[30] Foreign Application Priority Data

Oct. 25, 1995 [JP] Japan ................................. 7-278075

[51] Int. Cl.$^6$ ................................................ B23K 35/22
[52] U.S. Cl. .............................. 219/145.22; 219/146.23
[58] Field of Search .................................. 219/137 WM, 219/145.22, 146.23

[56] References Cited

U.S. PATENT DOCUMENTS

| | | | |
|---|---|---|---|
| 3,716,691 | 2/1973 | Baybrook et al. | 219/137 WM |
| 5,124,529 | 6/1992 | Nishikawa et al. | |
| 5,219,425 | 6/1993 | Nishikawa et al. | 219/145.22 |
| 5,378,871 | 1/1995 | Nishikawa et al. | |

FOREIGN PATENT DOCUMENTS

| | | |
|---|---|---|
| 61-238495 | 10/1986 | Japan . |
| 3-264194 | 11/1991 | Japan . |
| 5-138394 | 6/1993 | Japan . |

*Primary Examiner*—Clifford C. Shaw
*Attorney, Agent, or Firm*—Oblon, Spivak, McClelland, Maier & Neustadt, P.C.

[57] ABSTRACT

A high nitrogen flux cored wire for welding of Cr—Ni type stainless steel is formed by filling a flux into a sheath of stainless steel. The flux is composed of N and nitrogen compound (total converted value of N): 0.05 to 0.30 wt % with respect to total weight of wire, in the sheath and the flux; and $TiO_2$: 4.0 to 8.0 wt %, $SiO_2$: 0.3 to 3.0 wt %, $Al_2O_3$: 0.05 to 1.5 wt %, metal fluoride (converted value of F): 0.05 to 0.7 wt %, $ZrO_2$: less 0.5 wt %, and metal carbonate: less than or equal to 1.0 wt % with respect to total weight of the wire, in said flux.

20 Claims, 1 Drawing Sheet

HIGH NITROGEN FLUX CORED WELDING WIRE FOR CR-NI TYPE STAINLESS STEEL

BACKGROUND OF THE INVENTION

1. Field of the Invention

The present invention relates to a high nitrogen flux cored welding wire to be used for welding of a Cr—Ni type stainless steel, which has superior pitting corrosion resistance, crevice corrosion resistance and so forth and can provide enhanced workability in welding, such as arc stability, slag removing characteristics and so forth.

2. Description of the Related Art

In welding of stainless steel, associating with demand for higher efficiency and for automating, application of flux cored wire is abruptly spreading. In the recent years, study has been made for application of stainless steel as strength member of building, and high nitrogen austenitic stainless steel, such as SUS 304N2 and so forth is in the limelight. High nitrogen austenitic stainless steel has high strength and superior characteristics in pitting corrosion resistance, crevice corrosion resistance and so forth. Accordingly, by realization of weight saving of strength member and improvement of corrosion resistance, high nitrogen austenitic stainless steel has been used in a wide range of application, such as water gate, chemical tanker and so forth. Also, ferrite-austenitic duplex stainless steel has similar characteristics and thus has spreading application in place of 304L type or so forth.

Even in welding of these strength member, high nitrogen flux cored wire for welding of Cr—Ni type stainless steel with improved corrosion resistance of welded metal has already been developed (Japanese Unexamined Patent Publication (Kokai) No. Heisei 3 (1991)-264194.

When nitrogen content in the wire gets higher, problems are encountered with its increasing tendency to splatter, and in the significant degradation of its slag removing characteristics. Therefore, there is a demand for high nitrogen flux cored wire which can further improve workability in welding. Particularly, among various joints, in one side welded joint which has been widely used in actual construction, poor slag removing characteristics of front surface and back surface of initial welded metal is not desirable for hindering welding operation. Furthermore, residual slag should increase slag inclusion.

On the other hand, high nitrogen flux cored wire for welding of Cr type stainless steel with improved workability in welding and mechanical performance of the welded metal, and so forth have been disclosed (Japanese Unexamined Patent Publication No. Heisei 5 (1993)-138394). However, since Cr type stainless steel and Cr—Ni type stainless steel are different in characteristics, such as linear expansion coefficient, melting point and so forth, it is not possible to restrict lowering of workability on welding due to increasing of nitrogen content by assimilating the flux composition of the wire for Cr—Ni type to the flux composition of the disclosed Cr type.

A flux cored wire for Cr—Ni type stainless steel with low nitrogen content has been known (Japanese Examined Patent Publication (Kokoku) NO. Heisei 5 (1993)-18679. This flux cored wire may provide superior workability. However, since it is low nitrogen type, it becomes difficult to obtain sufficient corrosion resistance and strength of the welded metal.

As set forth above, in the prior art, there has not been developed a high nitrogen flux cored wire for welding of Cr—Ni type stainless steel, which can satisfy both improvement of strength and corrosion resistance by increased the content of nitrogen and good workability in welding, primarily slag removing characteristics.

SUMMARY OF THE INVENTION

Therefore, it is an object of the present invention to provide a high nitrogen flux cored wire for welding of Cr—Ni type stainless steel which can achieve superior pitting corrosion resistance and crevice corrosion resistance of the welded metal, and in conjunction therewith, can obtain good workability in welding.

According to one aspect of the invention, a high nitrogen flux cored wire for welding of Cr—Ni type stainless steel, which is formed by filling a flux into a sheath of stainless steel, is composed of:

N and nitrogen compound (total converted value of N): 0.05 to 0.30 wt % with respect to total weight of the wire in the sheath and the flux; and $TiO_2$: 4.0 to 8.0 wt %, $SiO_2$: 0.3 to 3.0 wt %, $Al_2O_3$: 0.05 to 1.5 wt %, metal fluoride (converted value of F): 0.05 to 0.7 wt %, $ZrO_2$: less than 0.5 wt %, and metal carbonate: less than or equal to 1.0 wt % with respect to total weight of the wire, in said flux.

According to another aspect of the invention, high nitrogen flux cored wire for welding of Cr—Ni type stainless steel, which is formed by filling a flux into a sheath of stainless steel, is composed of:

N and nitrogen compound (total converted value of N): 0.05 to 0.30 wt % with respect to total weight of the wire in the sheath and the flux; and $TiO_2$: 4.0 to 8.0 wt %, $SiO_2$: 0.3 to 3.0 wt %, $Al_2O_3$: 0.05 to 1.5 wt %, and metal fluoride (converted value of F): 0.05 to 0.7 wt %, and as inevitable impurity, $ZrO_2$ being restricted to less than 0.5 wt %, and metal carbonate to less than or equal to 1.0 wt % with respect to total weight of the wire, in said flux.

Preferably, a total amount of contents of Nb and V with respect to the overall weight of the wire in the sheath and flux is restricted to be less than or equal to 0.3 wt %, and assuming converted value of F and converted value of N, and contents of Nb and V with respect to total weight of the wire are respectively [F], [N], [Nb] and [V], a value calculated from ([F]/([N]+3×([Nb]+[V])((( is greater than or equal to 0.2.

The inventors made various study for correlation between the wire composition and welding workability, such as arc stability, spatter generation amount, slag coverage, slag removing characteristics, bead shape and so forth, in the flux cored wire for welding Cr—Ni type stainless steel having high nitrogen content. Various study have also made through experiments about association between the wire composition and welding defect, such as slag inclusion, blow hole and so forth. In this case, concerning the effect for slag removing characteristics of metal fluoride, it has been found that good slag removing characteristics can be obtained by containing an appropriate amount of metal fluoride in the high nitrogen wire. Particularly, in one side welding, in which slag removing characteristics can be a significant problem, with respect to slag removing characteristics at the back surface of the first layer bead, a quit good effect can be obtained.

Namely, the inventors have found that by restricting the nitrogen content in the wire at an appropriate amount, and by containing appropriate amount of metal oxide and metal fluoride as slag forming agent, high nitrogen flux cored wire for welding Cr—Ni type stainless steel with good welding workability despite of high nitrogen content, can be obtained.

Hereinafter, discussion will be given for chemical components contained in the high nitrogen flux cored wire for welding of Cr—Ni type stainless steel in the present invention, and reason for limitation of the composition.

N and Nitrogen Compound (Converted value of N): 0.05 to 0.03 wt %

Nitrogen is solid solution enhancement element, similarly to carbon, and has effect of increasing strength of the welded metal and for improving pitting corrosion resistance, crevice corrosion resistance and so forth. When the nitrogen content in the wire is less and 0.05 wt %, sufficient effect cannot be obtained. On the other hand, when the nitrogen content exceeds 0.30 wt %, possibility of occurrence of welding defect, such as blow hole and so forth is increased. Also, even when the nitrogen content is further increased, the effect of improving strength, pitting corrosion resistance, crevice corrosion resistance can be lowered. Accordingly, the content of N and nitrogen compound versus overall weight of the wire is preferred in a range of 0.05 to 0.30 wt % in converted score of N. It should be noted that N is contained in either or both of steel sheath and flux, when N is contained in the flux in a form of nitrogen compound, the foregoing preferred range is applied for total amount as converted into N.

$TiO_2$: 4.0 to 8.0 wt %

$TiO_2$ has effects of improvement of stability of arc, and stabilization of slag covering ability. $TiO_2$ also has an effect for making bead shape good. When $TiO_2$ content is less than 4.0 wt %, sufficient effect can not be obtained. On the other hand, when the content of $TiO_2$ exceeds 8.0 wt % is not desirable for lowering of flow ability of the slag to cause of inclusion of slag, conversely. Accordingly, the content of $TiO_2$ with respect to total weight of the wire is preferred to be in a range of 4.0 to 8.0 wt %.

$ZrO_2$: Less than 0.5 wt %

When $ZrO_2$ is excessively contained in the flux, and the content becomes greater than or equal to 0.5 wt %, solidifying ability of the slag is significantly increased to cause degradation of intimacy and shape of the bead. Also, in the high nitrogen flux cored wire having nitrogen content in the range of 0.05 to 0.30 wt % as in the present invention, if the content of $ZrO_2$ becomes greater than or equal to 0.5 wt %, slag removing characteristics at the back surface of first layer bead upon the one side welding can be significantly lowered. Therefore, the content of $ZrO_2$ in the flux has to be limited to be less than 0.5 wt % relative to the overall weight of the wire. More preferably, the content of $ZrO_2$ is limited to be less than 0.3 wt %.

$SiO_2$: 0.3 to 3.0 wt %

$SiO_2$ forms slag having good covering ability relative to the welded metal makes bead to have good intimacy. When the content of $SiO_2$ is less than 0.3 wt %, sufficient effect cannot be obtained. On the other hand, when the content of $SiO_2$ exceeds 3.0 wt %, viscosity of the slag becomes higher to cause degradation of the bead shape and/or inclusion of the slag. Accordingly, the preferred range of content of $SiO_2$ relative to the overall weight of the wire is in a range of 0.3 to 3.0 wt %.

$Al_2O_3$: 0.05 to 1.5 wt %

$Al_2O_3$ adjusts flow ability of the slag to make the bead shape good. Also, by adding an appropriate amount of $Al_2O_3$, removing characteristics of the slag can be improved. When the content of $Al_2O_3$ is less than 0.05 wt %, sufficient effect cannot be obtained. On the other hand, when the content of $Al_2O_3$ exceeds 1.5 wt %, the bead shape can be degraded, and removing characteristics of the slag can be lowered significantly. Accordingly, the preferred range of the content of $Al_2O_3$ relative to the overall weight of the wire is 0.05 to 1.5 wt %.

Metal fluoride (converted value of F): 0.05 to 0.7 wt %

Metal fluoride has remarkable effect in improving release characteristics of slag relative to the welded metal of Cr—Ni type austenitic stainless steel with high nitrogen content. Namely, when nitrogen content in the flux cored wire is high, slag removing characteristics can be lowered. Therefore, in order to assure good removing characteristics of the slag, it becomes inherent to contain the metal fluoride in a given amount or more in addition of the composition of the flux.

The slag removing characteristics is also affected by thickness of the slag. For example, when one welded metal is formed, if the thickness of slag at the location adjacent the bead is quite thin, the slag removing ability at such portion becomes no good. When the flux cored wire for welding Cr—Ni type austenitic stainless steel, with low nitrogen content is used, this tendency becomes low. However, when the high nitrogen flux cored wire is used, it becomes difficult to obtain good slag removing characteristics when the thickness of the slag adjacent the bead is thin. Since the metal fluoride has effect to make the thickness of the slag uniform, addition of metal fluoride may improve slag removing characteristics even in this viewpoint. When the content of metal fluoride is less than 0.05 wt % as converted value of F, sufficient effect cannot be obtained. On the other hand, when the content of metal fluoride exceeds 0.7 wt %, no further improvement of effect cannot be obtained. Conversely, when the content of metal fluoride exceeds 0.7 wt %, spatter generation amount can be increased. Accordingly, the preferred range of content of metal fluoride versus the overall weight of the wire is 0.05 wt % to 0.7 wt % as converted value of F. More preferable range of metal fluoride is 0.25 to 0.7 wt %. It should be noted that the effect for slag removing characteristics of metal fluoride is the same at the same converted value of F irrespective of kind of metal fluoride. Therefore, kind of metal fluoride is not particularly specified. For example, any of metal fluorides, such as $NaF$, $CaF_2$, $K_2SiF_6$, $AlF_3$, $K_2ZrF_6$ and so forth may be applicable.

Metal carbonate: less than or equal to 1.0 wt %

By adding metal carbonate in the flux, removing characteristics of the slag is lowered and spatter generation amount is significantly increased. Accordingly, the content of metal carbonate is limited to be less than or equal to 1.0 wt %. More preferably, the content of metal carbonate is limited to be less than or equal to 0.3 wt %.

The present invention is intended to achieve good workability in welding, particularly good slag removing characteristics with using flux cored wire having high nitrogen content, and the composition of the wire is defined as set forth above through various tests. Furthermore, by defining impurity component or so forth in the wire, slag removing characteristics can be further improved. Hereinafter, inherently admixed impurity components and reason of limitation of contents of those impurity components will be discussed.

Content of (Nb+V): less than or equal to 0.3 wt % [F]/([N]+3([Nb]+[V])): more than or equal to 0.2

Nb and V as impurity components in the wire significantly affect for slag removing characteristics. Also, in high nitrogen flux cored wire, due to supra-additive effect of N, Nb and V, slag removing characteristics is lowered significantly.

Restriction of lowering of the slag removing characteristics can be achieved by adjusting content of slag forming agent in the wire. However, when the total amount of contents of Nb and V exceeds 0.3 wt %, only adjustment of slag forming agent becomes insufficient.

On the other hand, assuming that the contents of F, N, Nb and V in the wire are respectively [F], [N], [Nb] and [V], when a value calculated from $([F]/([N]+3\times([Nb]+[V])))$ becomes greater than or equal to 0.2, good slag removing characteristics can be certainly maintained. Accordingly, it is preferred that the content of Nb and V with respect to total weight of the wire is less than or equal to 0.3 wt %, and the value calculated from $([F]/([N]+3\times([Nb]+[V])))$ becomes greater than or equal to 0.2.

In the present invention, in addition to the foregoing components, various slag forming agents may be added. The kind and amount of such slag forming agent is not particularly specified. For example, in the flux constituting the flux cored wire for welding of stainless steel, alloy components, such as Ni, Cr, Mo or so forth is contained. However, content of these components are variable depending upon intended kind of steel. Therefore, the contents of these components are not specified in the present invention. Also, content of deoxidizing agent, such as Si, Mn, Ti, Al, Mg, Zr and so forth, and content of C is not specifically limited, and thus can be added as required.

Also, as a form of flux cored wire, there is a wire formed by filling the flux within a seamless tube or a stainless steel thin plate formed into a pipe shaped configuration. Variety of cross sectional configuration can be taken in the latter case. However, the present invention is applicable for any form of flux cored wire. Concerning shield gas, any of 100% $CO_2$ gas and mixture gas of Ar and 20% $Co_2$ gas may be applicable.

According to the present invention, since an appropriate amount of nitrogen is contained in the wire, superior pitting corrosion resistance and crevice corrosion resistance of the welded metal can be attained. Also, in the present invention, since the contents are defined to contain appropriate content of slag forming agent, alloying component and so forth, high nitrogen flux cored wire for welding of Cr—Ni type stainless steel, having good workability in welding, can be attained. Also, by appropriately defining contents of impurity components and F and N, slag removing characteristics can be improved.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

EMBODIMENTS

Figure 1:
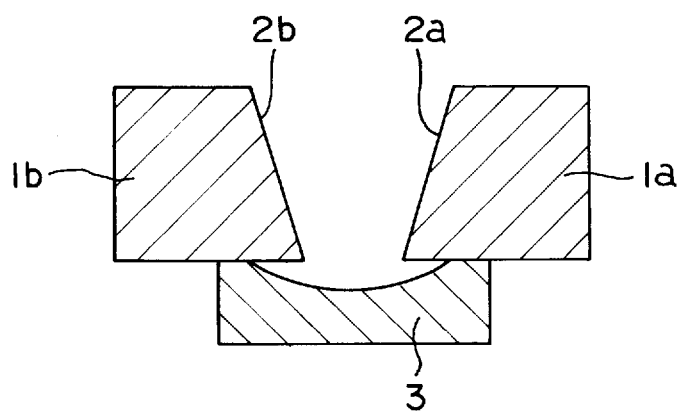
FIG. 1 is a diagrammatic section showing a beveling configuration of a welding base metal.

Hereinafter, embodiments of high nitrogen flux cored wire for welding Cr—Ni type stainless steel according to the present invention will be discussed concretely with comparison with comparative examples.

At first, with employing steel sheathes of the following table 1, the flux cored wires were prepared. Then, utilizing these flux cored wires, one side welding was performed in one layer and one pass for welding base metals having chemical compositions as shown in the following table 2. Then, workability in welding, such as slag removing characteristics at front surface and back surface of first layer bead was evaluated. At this time, the welding conditions were as follows; welding current: 170A (DCEP), welding voltage: 27V, shield gas: 80% Ar-20% $CO_2$, gas flow rate: 25 litters/minutes.

FIG. 1 is a diagrammatic section showing edge shape of welding base metal. As shown in FIG. 1, welding base metals 1a and 1b are formed with oblique surfaces 2a and 2b to have upwardly opened V-shaped edge configuration. Both base metals 1a and 1b were arranged in slightly spaced apart relationship. On the other hand, on the lower portion of the base metals 1a and 1b, a backing member 3 having a recess extending from the central portion of the upper surface to the circumferential portion, was fitted. It should be noted that in the examples and the comparative examples, welding base metals 1a and 1b having thickness of 12 mm were used. The base metals 1a and 1b are arranged to form an edge angle of 60° and had a distance of 8 mm at the bottom portion. Chemical compositions of respective wires are shown in the following tables 3 to 10. Also, the results of evaluation of workability in welding is shown in the following tables 11 and 12, wherein in the columns of evaluation results, o represents quite good, ○ represents good and x represents no good.

TABLE 1

| SHEATH SIGN | CHEMICAL COMPOSITION OF SHEATH (wt %) | | | | | | | | | | | |
|---|---|---|---|---|---|---|---|---|---|---|---|---|
| | C | Si | Mn | P | S | Cu | Ni | Cr | Mo | V | Nb | N |
| A | 0.015 | 0.44 | 1.02 | 0.023 | 0.006 | 0.03 | 9.80 | 19.41 | 0.02 | tr | 0.005 | 0.012 |
| B | 0.025 | 0.56 | 1.25 | 0.020 | 0.002 | 0.20 | 10.03 | 19.01 | 0.30 | 0.16 | 0.24 | 0.041 |
| C | 0.016 | 0.36 | 1.15 | 0.022 | 0.005 | 0.08 | 9.95 | 19.68 | 0.01 | 0.02 | 0.10 | 0.025 |

TABLE 2

| BASE METAL SIGN | CHEMICAL COMPOSITION OF BASE METAL (wt %) | | | | | | | | | |
|---|---|---|---|---|---|---|---|---|---|---|
| | C | Si | Mn | P | S | Cu | Ni | Cr | Mo | N |
| X | 0.031 | 0.65 | 1.02 | 0.023 | 0.006 | 0.05 | 9.20 | 18.91 | 0.12 | 0.11 |
| Y | 0.025 | 0.56 | 1.25 | 0.020 | 0.002 | 0.10 | 12.03 | 18.41 | 2.51 | 0.13 |
| Z | 0.024 | 0.57 | 0.91 | 0.022 | 0.005 | 0.05 | 6.25 | 22.88 | 2.89 | 0.12 |

TABLE 3

| No. | SHEATH SIGN | BASE METAL SIGN | FLUX RATIO (wt %) | CHEMICAL COMPOSITION OF FLUX (wt %) | | | | | |
|---|---|---|---|---|---|---|---|---|---|
| | | | | $TiO_2$ | $SiO_2$ | $ZrO_2$ | $Al_2O_3$ | $Na_2O$ | $K_2O$ |
| EXAMPLES | | | | | | | | | |
| 1 | A | Z | 24.5 | 5.42 | 1.11 | — | 0.19 | 0.12 | 0.24 |
| 2 | C | X | 24.5 | 6.12 | 0.37 | 0.12 | 1.42 | 0.14 | 0.14 |
| 3 | B | Y | 23.0 | 5.18 | 1.09 | — | 0.21 | 0.11 | 0.13 |
| 4 | C | X | 25.0 | 4.12 | 1.51 | — | 1.01 | 0.28 | 0.17 |
| 5 | C | Z | 24.5 | 5.87 | 2.83 | — | 0.11 | 0.08 | 0.19 |
| 6 | B | X | 25.0 | 6.08 | 1.12 | — | 0.70 | 0.12 | 0.23 |
| 7 | C | Y | 24.5 | 5.43 | 1.17 | 0.29 | 0.27 | 0.11 | 0.06 |
| 8 | A | Z | 24.5 | 6.22 | 0.62 | — | 0.25 | 0.10 | 0.05 |
| 9 | A | Z | 26.0 | 5.76 | 1.25 | — | 0.29 | 0.11 | 0.06 |
| 10 | C | Z | 25.0 | 5.54 | 1.13 | — | 0.26 | 0.10 | 0.06 |
| 11 | C | X | 24.0 | 7.25 | 0.59 | — | 0.65 | 0.10 | 0.05 |
| 12 | C | Z | 25.0 | 6.09 | 1.12 | — | 0.36 | 0.10 | 0.06 |
| 13 | A | X | 24.5 | 6.40 | 0.98 | — | 0.49 | 0.11 | 0.10 |
| 14 | A | Z | 24.5 | 5.41 | 1.13 | — | 0.25 | 0.11 | 0.10 |
| 15 | C | X | 24.5 | 5.28 | 2.38 | — | 0.25 | 0.11 | 0.10 |
| 16 | C | X | 25.0 | 7.89 | 1.10 | — | 0.08 | 0.09 | 0.21 |
| 17 | C | X | 25.0 | 5.37 | 1.10 | — | 1.12 | 0.09 | 0.21 |
| 18 | B | Y | 25.0 | 6.33 | 1.09 | 0.45 | 0.36 | 0.09 | 0.21 |
| 19 | C | X | 23.0 | 4.95 | 1.07 | — | 0.22 | 0.11 | 0.13 |
| 20 | C | X | 25.0 | 5.81 | 0.71 | 0.40 | 0.20 | 0.09 | 0.21 |

TABLE 4

| No | CHEMICAL COMPOSITION OF FLUX (wt %) | | | | | | | Converted Value of F |
|---|---|---|---|---|---|---|---|---|
| | $LiCO_3$ | $CaCO_3$ | NaF | $CaF_2$ | $AlF_2$ | $K_2SiF_6$ | $CeF_3$ | |
| EXAMPLES | | | | | | | | |
| 1 | — | — | 0.42 | 0.12 | — | — | 0.25 | 0.32 |
| 2 | — | — | 0.46 | — | — | 0.12 | — | 0.27 |
| 3 | 0.10 | — | 0.12 | — | — | — | — | 0.05 |
| 4 | 0.07 | — | 0.12 | — | — | 0.05 | — | 0.08 |
| 5 | — | — | 0.11 | — | — | 0.17 | — | 0.14 |
| 6 | — | — | 0.17 | — | — | 0.13 | — | 0.14 |
| 7 | 0.07 | — | 0.57 | — | 0.07 | — | 0.11 | 0.34 |
| 8 | 0.18 | — | 0.81 | — | — | — | — | 0.37 |
| 9 | 0.03 | 0.43 | 0.86 | 0.39 | — | 0.14 | — | 0.65 |
| 10 | 0.16 | 0.39 | 0.28 | — | — | — | — | 0.13 |
| 11 | — | — | 0.13 | 0.08 | — | — | — | 0.10 |
| 12 | 0.05 | — | 0.14 | 0.15 | 0.05 | — | — | 0.17 |
| 13 | 0.07 | 0.05 | 0.46 | — | — | 0.09 | 0.07 | 0.27 |
| 14 | — | — | 0.57 | 0.05 | — | — | — | 0.28 |
| 15 | 0.59 | 0.35 | 0.46 | — | — | — | — | 0.21 |
| 16 | 0.15 | — | 0.20 | — | — | — | — | 0.09 |
| 17 | — | 0.42 | 0.24 | — | — | 0.12 | — | 0.17 |
| 18 | — | — | 0.24 | — | — | 0.08 | — | 0.15 |
| 19 | 0.20 | — | 0.54 | 0.84 | — | — | — | 0.65 |
| 20 | — | — | 0.24 | — | 0.27 | — | 0.35 | 0.39 |

TABLE 5

| No | CHEMICAL COMPOSITION OF FLUX (wt %) | | | |
|---|---|---|---|---|
| | MgO | CaO | MnO | OTHER |
| EXAMPLES | | | | |
| 1 | — | — | — | 0.21 |
| 2 | — | — | — | 0.06 |
| 3 | 0.14 | — | — | 0.11 |
| 4 | — | — | 0.15 | 0.06 |
| 5 | — | — | — | 0.11 |
| 6 | — | — | — | 0.09 |
| 7 | 0.05 | — | — | 0.06 |
| 8 | — | — | — | 0.09 |
| 9 | — | — | — | 0.09 |
| 10 | — | — | — | 0.12 |
| 11 | — | — | 0.07 | 0.06 |
| 12 | — | — | — | 0.09 |
| 13 | — | — | — | 0.08 |
| 14 | 0.12 | 0.05 | — | 0.06 |

TABLE 5-continued

| | CHEMICAL COMPOSITION OF FLUX (wt %) | | | |
|---|---|---|---|---|
| No | MgO | CaO | MnO | OTHER |
| 15 | — | — | — | 0.06 |
| 16 | — | — | — | 0.09 |
| 17 | — | — | — | 0.07 |
| 18 | — | — | — | 0.13 |
| 19 | — | — | — | 0.08 |
| 20 | — | — | — | 0.09 |

TABLE 6

| | CHEMICAL COMPOSITION OF WIRE (wt %) | | | | | | | |
|---|---|---|---|---|---|---|---|---|
| No | Converted Value of N | V | Nb | V + Nb | Cr | Ni | Mo | $F/\{N + 3(V + Nb)\}$ |
| EXAMPLES | | | | | | | | |
| 1 | 0.13 | — | 0.00 | 0.00 | 22.56 | 8.89 | 2.92 | 2.46 |
| 2 | 0.05 | 0.02 | 0.08 | 0.10 | 19.02 | 8.68 | 0.05 | 0.77 |
| 3 | 0.12 | 0.12 | 0.18 | 0.30 | 18.41 | 11.89 | 2.12 | 0.05 |
| 4 | 0.06 | 0.02 | 0.08 | 0.10 | 18.53 | 8.91 | 0.12 | 0.22 |
| 5 | 0.08 | 0.02 | 0.08 | 0.10 | 22.35 | 8.43 | 2.89 | 0.37 |
| 6 | 0.12 | 0.12 | 0.18 | 0.30 | 19.31 | 8.94 | 0.25 | 0.14 |
| 7 | 0.08 | 0.02 | 0.08 | 0.10 | 18.32 | 11.98 | 2.35 | 0.89 |
| 8 | 0.29 | — | 0.00 | 0.00 | 22.93 | 8.32 | 2.54 | 1.28 |
| 9 | 0.20 | — | 0.00 | 0.00 | 22.51 | 8.16 | 2.81 | 3.25 |
| 10 | 0.16 | 0.02 | 0.08 | 0.10 | 21.99 | 8.1 | 2.77 | 0.28 |
| 11 | 0.08 | 0.02 | 0.08 | 0.10 | 18.56 | 8.98 | 0.08 | 0.26 |
| 12 | 0.11 | 0.02 | 0.08 | 0.10 | 22.81 | 8.56 | 2.66 | 0.41 |
| 13 | 0.11 | — | 0.00 | 0.00 | 19.1 | 8.59 | 0.06 | 2.45 |
| 14 | 0.13 | — | 0.00 | 0.00 | 22.49 | 9.03 | 1.06 | 2.15 |
| 15 | 0.12 | 0.02 | 0.08 | 0.10 | 18.34 | 8.89 | 0.03 | 0.50 |
| 16 | 0.08 | 0.02 | 0.08 | 0.10 | 18.56 | 9.02 | 0.03 | 0.24 |
| 17 | 0.08 | 0.02 | 0.08 | 0.10 | 18.22 | 8.74 | 0.05 | 0.45 |
| 18 | 0.12 | 0.13 | 0.18 | 0.31 | 17.98 | 11.69 | 2.90 | 0.14 |
| 19 | 0.10 | 0.02 | 0.08 | 0.10 | 19.34 | 9.16 | 0.15 | 1.63 |
| 20 | 0.11 | 0.02 | 0.08 | 0.10 | 18.41 | 8.69 | 0.12 | 0.95 |

TABLE 7

| | SHEATH | BASE METAL | FLUX RATIO | CHEMICAL COMPOSTION OF FLUX (wt %) | | | | | |
|---|---|---|---|---|---|---|---|---|---|
| No | SIGN | SIGN | (Wt %) | $TiO_2$ | $SiO_2$ | $ZrO_2$ | $Al_2O_3$ | $Na_2O_3$ | $K_2O$ |
| COMPARATIVE | | | | | | | | | |
| 21 | C | X | 25.0 | 8.25 | 0.38 | — | 0.08 | 0.11 | 0.22 |
| 22 | C | Z | 25.0 | 5.12 | 2.13 | 0.59 | 0.40 | 0.11 | 0.22 |
| 23 | A | X | 25.0 | 2.90 | 2.89 | 1.60 | 0.51 | 0.15 | 0.24 |
| 24 | C | Y | 25.0 | 6.32 | 0.28 | — | 0.26 | 0.15 | 0.24 |
| 25 | B | Y | 24.5 | 3.70 | 3.11 | — | 0.23 | 0.10 | 0.10 |
| 26 | C | X | 24.5 | 5.46 | 1.26 | — | 0.02 | 0.12 | 0.12 |
| 27 | A | Z | 24.5 | 5.46 | 1.18 | — | 1.65 | 0.12 | 0.12 |
| 28 | A | X | 24.5 | 5.39 | 1.13 | — | 0.23 | 0.12 | 0.14 |
| 29 | C | X | 24.5 | 6.12 | 0.52 | 1.12 | 0.03 | 0.12 | 0.14 |
| 30 | C | Y | 23.0 | 4.95 | 1.07 | — | 0.22 | 0.11 | 0.13 |
| 31 | B | X | 24.5 | 5.89 | 1.15 | — | 0.23 | 0.12 | 0.14 |
| 32 | C | Z | 24.5 | 6.60 | 0.22 | 0.40 | 0.44 | 0.09 | 0.22 |

TABLE 8

| No | Li$_2$CO$_3$ | CaCO$_3$ | NaF | CaF$_2$ | AlF$_3$ | K$_2$SiO$_6$ | CeF$_3$ | Converted Value of F |
|---|---|---|---|---|---|---|---|---|
| COMPARATIVE | | | | | | | | |
| 21 | — | — | 0.24 | — | — | 0.13 | — | 0.18 |
| 22 | — | 0.23 | 0.24 | 0.49 | — | 0.13 | — | 0.41 |
| 23 | 0.42 | — | 0.59 | — | — | 0.13 | — | 0.33 |
| 24 | — | — | 0.20 | 0.49 | — | 0.13 | — | 0.40 |
| 25 | — | 0.06 | 0.57 | 0.24 | — | — | — | 0.37 |
| 26 | 0.12 | — | 0.53 | — | — | — | — | 0.24 |
| 27 | 0.12 | — | — | 0.04 | — | — | 0.02 | 0.03 |
| 28 | — | 0.08 | 0.57 | 0.99 | — | 0.10 | — | 0.79 |
| 29 | 0.04 | 0.08 | 0.46 | 0.12 | — | — | — | 0.27 |
| 30 | 0.38 | 0.76 | 0.54 | 0.84 | — | — | — | 0.65 |
| 31 | 0.12 | — | 0.46 | — | 0.06 | — | — | 0.25 |
| 32 | 0.12 | — | 0.09 | — | — | — | — | 0.04 |

TABLE 9

| No | MgO | CaO | MnO | OTHER |
|---|---|---|---|---|
| COMPARATIVE | | | | |
| 21 | — | — | — | 0.03 |
| 22 | — | — | — | 0.11 |
| 23 | — | — | — | 0.07 |
| 24 | — | — | — | 0.09 |
| 25 | — | — | — | 0.07 |
| 26 | — | — | — | 0.09 |
| 27 | — | — | — | 0.12 |
| 28 | — | — | — | 0.09 |
| 29 | — | — | — | 0.06 |
| 30 | — | — | — | 0.08 |
| 31 | — | — | — | 0.09 |
| 32 | — | — | — | 0.18 |

TABLE 10

| No | Converted Value of N | V | Nb | V + Nb | Cr | Ni | Mo | F/{N + 3(V + Nb)} |
|---|---|---|---|---|---|---|---|---|
| COMPARATIVE | | | | | | | | |
| 21 | 0.08 | 0.02 | 0.08 | 0.10 | 17.99 | 8.65 | 0.05 | 0.47 |
| 22 | 0.11 | 0.02 | 0.08 | 0.10 | 20.89 | 8.34 | 2.54 | 1.00 |
| 23 | 0.04 | 0.02 | 0.08 | 0.10 | 18.04 | 8.56 | 0.10 | 0.97 |
| 24 | 0.08 | 0.02 | 0.08 | 0.10 | 18.32 | 11.52 | 2.89 | 1.05 |
| 25 | 0.14 | 0.12 | 0.18 | 0.30 | 18.32 | 11.35 | 2.32 | 0.36 |
| 26 | 0.09 | 0.02 | 0.08 | 0.10 | 18.98 | 8.25 | 0.02 | 0.62 |
| 27 | 0.23 | — | 0.00 | 0.00 | 22.01 | 8.69 | 2.45 | 0.13 |
| 28 | 0.10 | — | 0.00 | 0.00 | 18.64 | 8.55 | 0.02 | 7.90 |
| 29 | 0.11 | 0.02 | 0.08 | 0.10 | 19.03 | 8.88 | 0.01 | 0.66 |
| 30 | 0.10 | 0.02 | 0.08 | 0.10 | 18.32 | 11.30 | 2.90 | 1.63 |
| 31 | 0.33 | 0.12 | 0.18 | 0.30 | 18.45 | 8.12 | 0.23 | 0.20 |
| 32 | 0.11 | 0.02 | 0.08 | 0.10 | 21.20 | 8.86 | 2.56 | 0.10 |

TABLE 11

| | WORKABILITY IN WELDING | | | | |
|---|---|---|---|---|---|
| No | ARC STABILITY | SPATTER OCCURRENCE AMOUNT | SLAG REMOVING CHAR. | SLAG COVERING ABILITY | BEAD SHAPE |
| EXAMPLES | | | | | |
| 1 | ⊙ | ⊙ | ⊙ | ⊙ | ⊙ |
| 2 | ○ | ○ | ⊙ | ⊙ | ○ |
| 3 | ⊙ | ⊙ | ○ | ○ | ⊙ |
| 4 | ⊙ | ⊙ | ⊙ | ⊙ | ○ |
| 5 | ⊙ | ○ | ⊙ | ⊙ | ○ |
| 6 | ⊙ | ⊙ | ○ | ⊙ | ⊙ |
| 7 | ⊙ | ⊙ | ⊙ | ⊙ | ⊙ |
| 8 | ⊙ | ⊙ | ⊙ | ⊙ | ⊙ |
| 9 | ○ | ○ | ⊙ | ⊙ | ⊙ |
| 10 | ⊙ | ○ | ⊙ | ⊙ | ⊙ |
| 11 | ⊙ | ⊙ | ⊙ | ⊙ | ○ |
| 12 | ⊙ | ⊙ | ⊙ | ⊙ | ⊙ |
| 13 | ⊙ | ⊙ | ⊙ | ⊙ | ⊙ |
| 14 | ⊙ | ⊙ | ⊙ | ⊙ | ⊙ |
| 15 | ○ | ○ | ⊙ | ⊙ | ○ |
| 16 | ⊙ | ⊙ | ⊙ | ⊙ | ○ |
| 17 | ⊙ | ○ | ⊙ | ⊙ | ⊙ |
| 18 | ⊙ | ⊙ | ○ | ⊙ | ⊙ |
| 19 | ⊙ | ○ | ⊙ | ⊙ | ⊙ |
| 20 | ⊙ | ⊙ | ⊙ | ⊙ | ⊙ |

TABLE 12

| | WORKABILITY IN WELDING | | | | |
|---|---|---|---|---|---|
| No | ARC STABILITY | SPATTER OCCURRENCE AMOUNT | SLAG REMOVING CHAR. | SLAG COVERING ABILITY | BEAD SHAPE |
| COMPARATIVE | | | | | |
| 21 | x | x | ⊙ | ○ | x |
| 22 | ○ | ○ | x | ○ | x |
| 23 | ○ | ○ | x | x | x |
| 24 | ⊙ | ⊙ | ○ | x | x |
| 25 | ○ | ○ | ○ | ○ | x |
| 26 | ⊙ | ⊙ | ○ | ○ | x |
| 27 | ○ | ○ | x | ○ | x |
| 28 | x | x | ○ | ○ | ○ |
| 29 | ○ | ○ | ○ | x | x |
| 30 | ○ | x | x | ○ | ○ |
| 31 | ○ | x | x | ○ | ○ |
| 32 | ○ | ○ | x | x | x |

As shown in the foregoing tables 3 to 10, since the examples of Nos. 1 to 20 has chemical component in the flux and chemical components in the wire according to the present invention, being fixed in the value range defined as set forth above, superior effects in any items of workability in welding in comparison with the comparative examples could be obtained. Particularly, the examples Nos. 1, 2, 4, 5, 7 to 17, 19 and 20 satisfy the foregoing formula and thus demonstrate quite good slag removing characteristics in comparison with remaining embodiments and the comparative examples.

On the other hand, the comparative example No. 21 contained $TiO_2$ in the content exceeding the upper limit of the range defined by the present invention. Thus, it showed lowering of arc stability, generation of large amount of spatter, and degraded bead shape. The comparative example No. 22 contained $ZnO_2$ in the content exceeding upper limit of the range defined in the present invention. Therefore, the comparative example No. 22 showed poor slag removing characteristics and degradation of the bead shape. The comparative example No. 23 contained $TiO_2$ and $ZrO_2$ in the extent out of the range defined by the present invention. Therefore, the comparative example No. 23 showed lowering of slag coverage and slag removing characteristics, and degradation of the bead shape.

The comparative example No. 24 contained $SiO_2$ in the extent less than the lower limit of the range defined by the present invention to cause lowering of slag coverage and degradation of the bead shape. On the other hand, since the comparative example No. 24 satisfied the value defined by the foregoing formula, it showed better slag removing characteristics in comparison with the comparative example No. 32. The comparative example No. 25 contained $TiO_2$ and $SiO_2$ in the content out of the range defined by the present invention, and the comparative example No. 26 contained $Al_2O_3$ in the content less than the lower limit of the range in the present invention. Thus, in either of the comparative examples Nos. 25 and 26, degradation of the bead shape is observed. The comparative example No. 27 contained Al$_2$O$_3$ in the content exceeding the upper limit of the range defined by the present invention to cause lowering of slag removing characteristics and degradation of the bead shape.

On the other hand, the comparative example No. 28 had the converted value of F exceeding the upper limit of the range defined by the present invention to make the arc unstable and to increase spatter generation amount. The comparative example No. 29 contained ZrO$_2$ and Al$_2$O$_3$ in the content out of the range defined by the present invention to lower slag coverage and to cause degradation of the bead shape. The comparative example No. 30 contained metal carbonate, the total amount of which exceeds the upper limit of the range defined in the present invention, and the comparative example No. 31 contained N (converted score) in the wire in the extend exceeding the upper limit of the range defined by the present invention. Therefore spatter generation amount was increased and the slag removing characteristics was lowered.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A high nitrogen flux cored wire for welding of Cr—Ni type-stainless steel, which is formed by filling a flux into a sheath of stainless steel, consisting essentially of:

N (converted value of N): 0.05 to 0.30 wt % with respect to total weight of the wire in the sheath and the flux; and TiO$_2$: 4.0 to 8.0 wt %, SiO$_2$: 0.3 to 3.0 wt %, Al$_2$O$_3$: 0.05 to 1.5 wt %, metal fluoride (converted value of F): 0.05 to 0.7 wt %, ZrO$_2$: less than 0.5 wt %, and metal carbonate: less than or equal to 1.0 wt % with respect to total weight of the wire, in said flux.

2. A high nitrogen flux cored wire as set forth in claim 1, wherein a total amount of contents of Nb and V with respect to total weight of the wire in the sheath and flux is restricted to be less than or equal to 0.3 wt %, and assuming converted value of F and converted value of N, and contents of Nb and V with respect to total weight of the wire are respectively [F], [N], [Nb] and [V], a value calculated from ([F]/([N]+3×([Nb]+[V]))) is greater than or equal to 0.2.

3. The flux cored wire of claim 2, wherein said metal fluoride (converted value of F) is present in an amount of 0.25 to 0.7 wt %, and said metal carbonate is present in an amount of less than or equal to 0.3 wt %.

4. The flux cored wire of claim 1, wherein said metal fluoride (converted value of F) is present in an amount of 0.25 to 0.7 wt %.

5. The flux cored wire of claim 1, wherein said metal carbonate is present in an amount of less than or equal to 0.3 wt %.

6. The flux cored wire of claim 1, further consisting essentially of at least one member selected from the group consisting of Ni, Cr, Mo, Si, Mn and Mg.

7. A high nitrogen flux cored wire for welding of Cr—Ni type stainless steel, which is formed by filling a flux into a sheath of stainless steel, consisting essentially of:

N (converted value of N): 0.05 to 0.30 wt % with respect to total weight of the wire in the sheath and the flux; and TiO$_2$: 4.0 to 8.0 wt %, SiO$_2$: 0.3 to 3.0 wt %, Al$_2$O$_3$: 0.05 to 1.5 wt %, and metal fluoride (converted value of F): 0.05 to 0.7 wt %, and as inevitable impurity, ZrO$_2$ being restricted to less than 0.5 wt %, and metal carbonate to less than or equal to 1.0 wt % with respect to total weight of the wire, in said flux.

8. A high nitrogen flux cored wire as set forth in claim 7, wherein a total amount of contents of Nb and V with respect to total weight of the wire in the sheath and flux is restricted to be less than 0.3 wt %, and assuming converted value of F and converted value of N, and contents of Nb and V with respect to total weight of the wire are respectively [F], [N], [Nb] and [V], a value calculated from ([F]/([N]+3×([Nb]+[V]))) is greater than or equal to 0.2.

9. The flux cored wire of claim 8, wherein said metal fluoride (converted value of F) is present in an amount of 0.25 to 0.7 wt %, and said metal carbonate is present in an amount of less than or equal to 0.3 wt %.

10. The flux cored wire of claim 7, wherein said metal fluoride (converted value of F) is present in an amount of 0.25 to 0.7 wt %.

11. The flux cored wire of claim 7, wherein said metal carbonate is present in an amount of less than or equal to 0.3 wt %.

12. The flux cored wire of claim 7, further consisting essentially of at least one member selected from the group consisting of Ni, Cr, Mo, Si, Mn and Mg.

13. A flux cored wire, comprising a stainless steel sheath and a flux, said flux comprising TiO$_2$: 4.0 to 8.0 wt %, SiO$_2$: 0.3 to 3.0 wt %, Al$_2$O$_3$: 0.05 to 1.5 wt %, metal fluoride (converted value of F): 0.05 to 0.7 wt %, ZrO$_2$: less than 0.5 wt %, and metal carbonate: less than or equal to 1.0 wt % with respect to total weight of the wire, wherein said flux cored wire comprises N (converted value of N): 0.05 to 0.30 wt % with respect to total weight of the flux cored wire.

14. The flux cored wire of claim 13, comprising Nb and V in an amount of less than or equal to 0.3 wt %, with respect to total weight of the flux cored wire, and assuming converted value of F and converted value of N, and contents of Nb and V with respect to total weight of the flux cored wire are respectively [F], [N], [Nb] and [V], a value calculated from ([F]/([N]+3×([Nb]+[V]))) is greater than or equal to 0.2.

15. A method of making the flux cored wire of claim 14, comprising:

filling said stainless steel sheath with said flux.

16. The flux cored wire of claim 13, wherein said metal fluoride (converted value of F) is present in an amount of 0.25 to 0.7 wt %.

17. The flux cored wire of claim 13, wherein said metal carbonate is present in an amount of less than or equal to 0.3 wt %.

18. The flux cored wire of claim 13, further comprising at least one member selected from the group consisting of Ni, Cr, Mo, Si, Mn and Mg.

19. The flux cored wire of claim 13, wherein said metal fluoride (converted value of F) is present in an amount of 0.25 to 0.7 wt %, and said metal carbonate is present in an amount of less than or equal to 0.3 wt %.

20. A method of making the flux cored wire of claim 13, comprising:

filling said stainless steel sheath with said flux.

* * * * *